March 18, 1941. G. P. LUCIUS 2,235,716
AIR PRESSURE INDICATING APPARATUS FOR PNEUMATIC TIRES
Filed Dec. 27, 1939 2 Sheets-Sheet 1
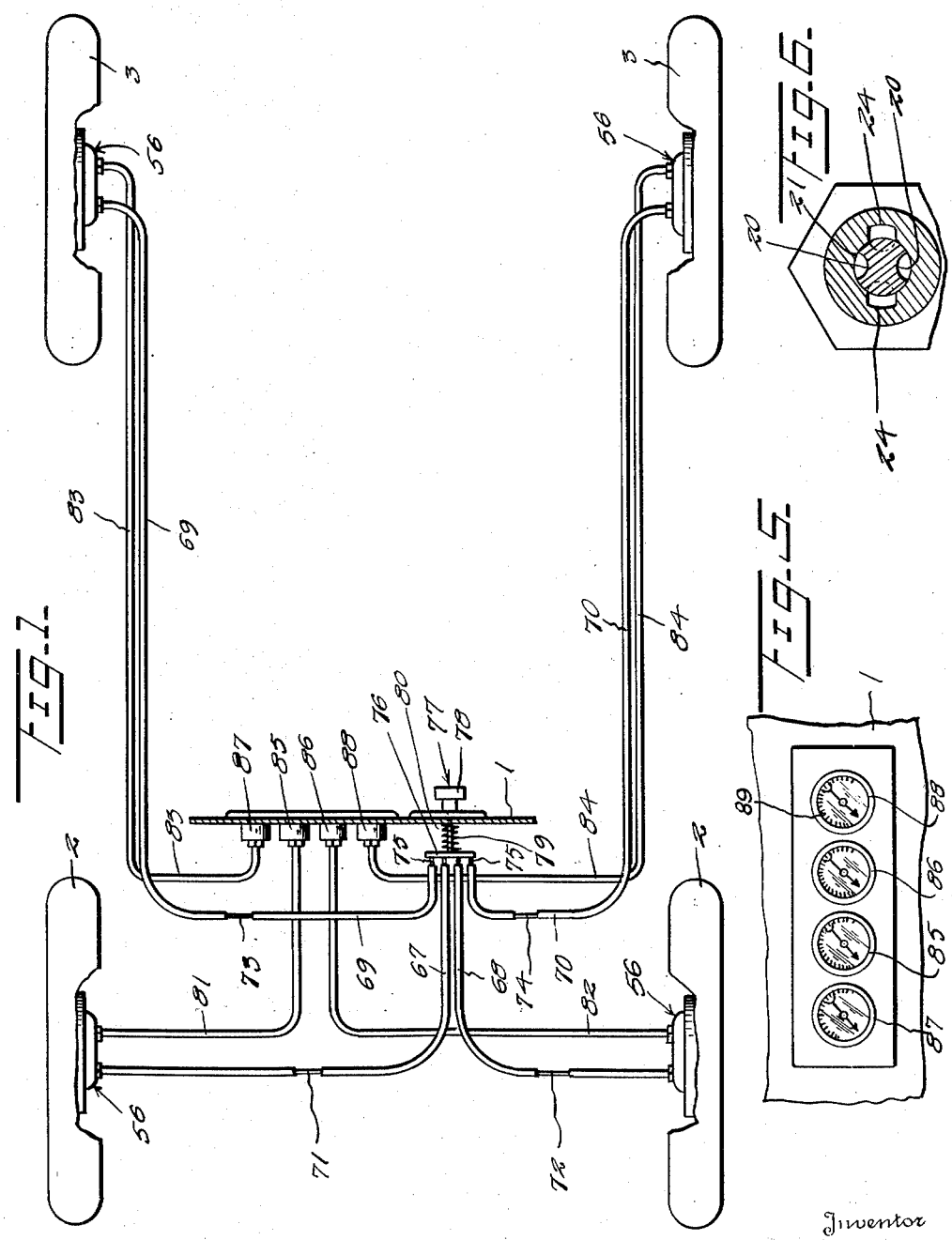
Inventor
G. P. Lucius
By Kimmel & Crowell
Attorneys March 18, 1941.  G. P. LUCIUS  2,235,716
AIR PRESSURE INDICATING APPARATUS FOR PNEUMATIC TIRES
Filed Dec. 27, 1939   2 Sheets-Sheet 2
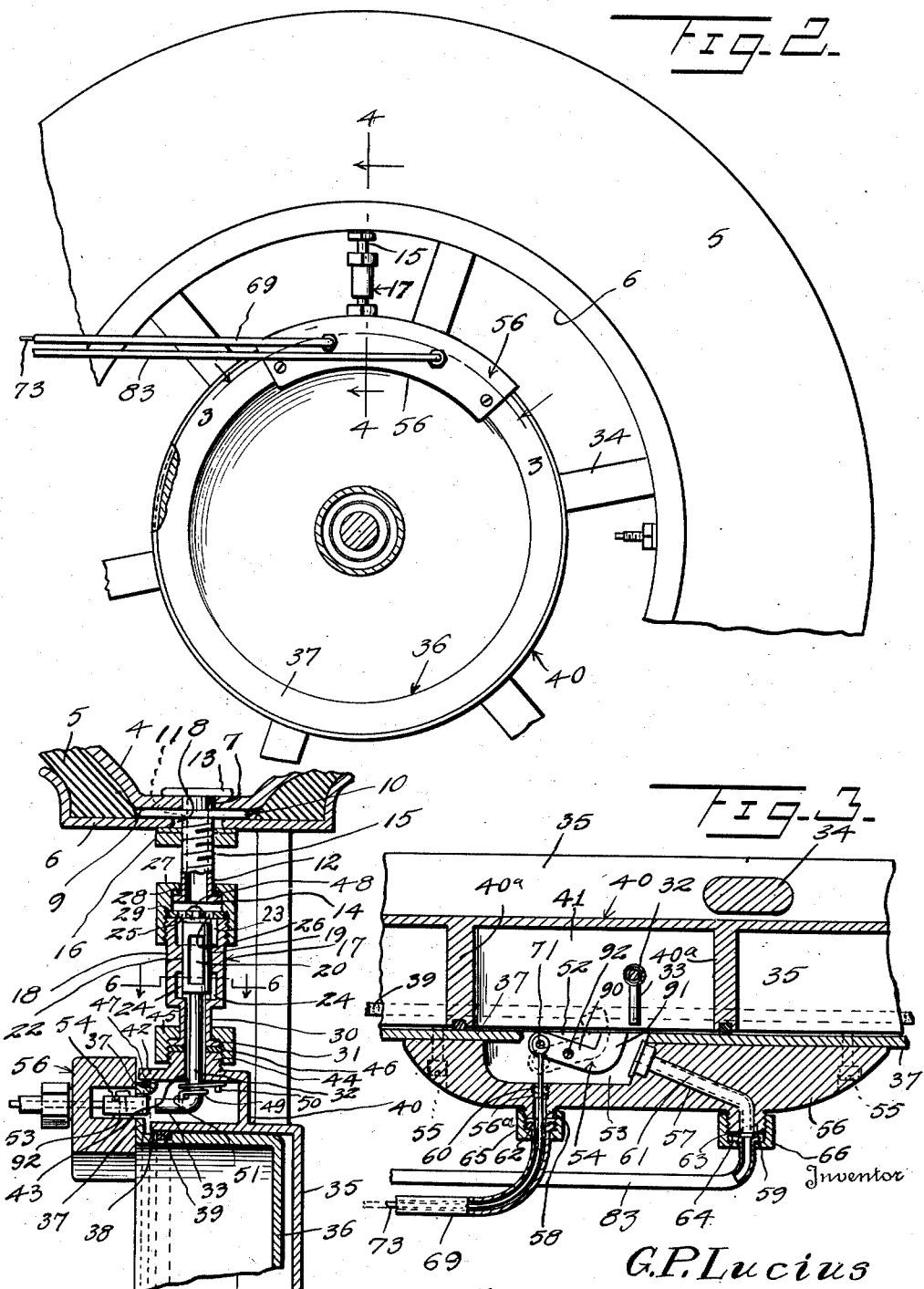
G. P. Lucius
By Kimmel & Crowell
Attorneys Patented Mar. 18, 1941

2,235,716

UNITED STATES PATENT OFFICE 2,235,716

AIR PRESSURE INDICATING APPARATUS FOR PNEUMATIC TIRES

George P. Lucius, Ruleville, Miss., assignor of two-fifths to John Calvin Twiner and one-fifth to H. Lee Herring, Ruleville, Miss.

Application December 27, 1939, Serial No. 311,197

2 Claims. (Cl. 73—31)

This invention relates to an air pressure indicating apparatus for pneumatic tires.

The invention aims to provide, in a manner as hereinafter set forth, an apparatus of the class referred to for attachment to an automotive vehicle for communication with the inner tubes of the tires of the vehicle and providing when active the making visible, to the driver of the vehicle the air pressure relation with respect to the tires under such conditions acting as a safeguard with respect to tire collapsing.

The invention further aims to provide, in a manner as hereinafter set forth, an apparatus of the class referred to controllable by the operator of an automotive vehicle from the dash board of the latter for determining the air pressure relation with respect to each tire while the vehicle is in motion.

The invention further aims to provide, in a manner as hereinafter set forth, an apparatus for the purpose referred to which is comparatively simple in its construction and arrangement, strong, durable, readily installed with respect to an automotive vehicle, thoroughly efficient in the use intended thereby, expeditiously made active when desired, readily assembled and comparatively inexpensive to manufacture.

Embodying the aims aforesaid, and others which may hereinafter appear, the invention consists of the novel construction, combination and arrangement of parts as will be more specifically referred to and as illustrated in the drawings, wherein is shown an embodiment of the invention, but it is to be understood that changes, variations and modifications may be resorted to which fall within the scope of the invention as claimed.

In the drawings:

Figure 1 is a top plan view of the apparatus showing the installation thereof with respect to the wheels and dash board of an automotive vehicle, Figure 2 is a fragmentary view, upon an enlarged scale looking towards the inner face of the right rear wheel of the vehicle illustrating the adaptation therewith of the apparatus, Figure 3 is a section, upon an enlarged scale on line 3—3, Figure 2, Figure 4 is a section, upon an enlarged scale on line 4—4, Figure 2, Figure 5 is a front elevation of the set of air pressure gauges forming elements of the apparatus, and Figure 6 is a section on line 6—6, Figure 4.

With reference to the drawings, the dashboard and the front and rear wheels of an automotive vehicle are shown. The dashboard is designated 1 and said front and rear wheels at 2, 3 respectively. The inner tube, outer shoe or tread member and the flanged rim of each wheel are indicated at 4, 5 and 6 respectively. The tube 4 has an opening 7. The rim 6 is formed with an opening 8, which aligns with the opening 7. Interposed between the tube 4 and flanged rim 6, as well as being arranged in the passage 9 formed by the outer shoe 5 is a resilient filler 10 having an opening 11 aligning with the openings 7, 8.

There is correlated with the tube 4 of each tire and air outlet nipple 12, of tubular form, which not only extends through the opening 7, but also through the openings 8, 11 and extends inwardly from the flanged rim 6. The nipple is open at each end and it is formed at one end with a laterally extended annular flange 13, which is tightly clamped, by a means to be referred to, against that portion of the inner face of tube 4 bordering the opening 7. The nipple 12 at its other end is formed with a laterally extending annular flange 14 for a purpose to be referred to. The nipple 12 is provided on its outer periphery with threads 15 for correlation with a lock nut 16. The latter when screwed home relative to the rim 6 and in connection with the flange 13 will tightly clamp the nipple 12 to tube 4, shoe 5 and rim 6, as well as tightly clamping tube 4, shoe 5, rim 6 and filler 10 together. The tightly clamping of flange 13 against tube 4 will prevent leakage and with the pressure outlet for and from tube 4 solely through that end of nipple 12 which opens into the interior of tube 4.

The nipple 12 constitutes an air pressure conductor leading to a controllable air pressure outlet valve structure 17, which is coupled to and is adapted to control the discharge of air pressure from the nipple 12. The structure 17 includes a cylindrical housing 18 for a turnable controlling valve 19 disposed on a vertical axis and of less length than the length of housing 18. When valve 19 is arranged in housing 18, it is spaced from each end of the latter. The valve 19 is formed at diametrically opposite points and lengthwise thereof with a pair of oppositely disposed rectangular pockets 20 in its outer surface of substantially semi-circular contour in transverse cross section. The pockets are of less length than the length of the body of the valve, spaced from the ends of the latter and constitute by-passes for a purpose to be referred to.

The wall 21 of the valve chamber 22, provided by the housing 18 in its upper end portion is formed with a pair of diametrically opposed upper cutouts 23, lengthwise thereof, which open into the chamber 22 and also at the upper end of the housing. The cutouts 23 constitute upper air pressure intakes. The said wall 21 in its lower end portion is formed with a pair of diametrically opposed lower cavities 24, lengthwise thereof, which open into the chamber 22 and constitute air pressure outlets. The cutouts 23 endwise align with and are spaced from the cavities 24. The upper ends of the cutouts 23 open into the chamber 22 above the valve 19. The lower portion of the cutouts 24 open into the chamber 22 below the valve 19. The pockets 20 in valve 19 are normally disposed at right angles to the cutouts 23 and cavities 24. Each pocket 20 is adapted for correlation with a cutout 23 and a cavity 24 to provide a by-pass for the passage of air pressure from a cutout 23 to a cavity 24 for the discharge of the air pressure into chamber 22 below valve 19.

Mounted on the open upper end of the housing 18 is a disc 25 having interposed between its axis and edge a row of perforations 26. The housing 18 on the upper portion of its outer periphery is formed with threads. Seated on the flange 14, at the lower end of and surrounding the nipple 12 is a depending annular coupling member 27 formed with an internal flange 28 which is mounted on flange 14, an internal shoulder 29, which bears on the marginal portion of the upper face of disc 25 and internal threads, which engage with the threads on the housing 18 for coupling the latter to the nipple 12 and for clamping the disc 25 on the housing. Formed integral with the lower end and having its inner face forming a continuation of the inner face of the housing 18 is a depending tubular air pressure discharge nipple 30 formed at its lower end with a laterally extending annular flange 31. Formed integral with the lower end and of greater length than the length of the valve 19 is a valve stem 32. The diameter of stem 32 is materially less than the diameter of the valve. The stem 32 passes down through, depends below the lower end of and is of less diameter than the diameter of nipple 30. The lower end of stem 32 is formed with an integral extension 33 disposed at right angles to the stem. The valve 19 is spring controlled and normally held by its controlling spring in a position whereby its pockets 20 will be clear of registration with and at right angles to the cutouts 23 and cavities 24. The controlling spring for the valve 19 will be presently referred to.

Connected to each rim 6 by the spaced couplers 34 is a drum 35 and interposed between the latter and the rim 6 is the valve structure 17. The latter is also connected to the drum 35, and the connection between drum and valve structure will be more fully referred to. The drum 35 and structure 17 bodily revolve with the rim 6. Arranged within and extended from the drum 35 is a stationary drum 36 formed with a flange 37, which opposes in spaced relation, the edge 38 of drum 35. Interposed between the drums 35, 36 is a sealing element 39 and which is disposed in close proximity to flange 37 and edge 38.

Mounted upon and secured to each drum 35 is an annular element 40 of angle shaped cross section provided with a pair of spaced parallel webs 40a, which in connection with element 40 and drum 35 forms an air pressure receiving chamber 41, which is open at its rear and closed at its ends and front. The top wall 42 of chamber 41 is formed with an opening 43 and on its outer face with an externally threaded collar 44 having its inner face providing a continuation of the wall of opening 43. Supported from the flange 31 of the nipple 30 is an internally threaded flanged coupling collar 45, which encompasses collar 44. Interposed between the collar 44 and the flange 31 is a sealing gasket 46. The collar 45 has threaded engagement with collar 44 for clamping the valve structure 17 and element 40 together, whereby said structure 17 is connected with the drum 35 and rim 6, so as to bodily rotate with the latter. The top wall 42 of chamber 41 overlies the outer edge of flange 37 and interposed between the latter and wall 42 is a sealing element 47.

The valve stem 32 depends through the collars 45, 44 and opening 43 into chamber 41. The extension 33 of stem 32 is arranged in chamber 41 above the bottom of the latter. The valve 19 is rotatably suspended from its upper end from the disc 25 as at 48. The controlling spring for valve 19 is indicated at 49 and it is arranged in the chamber 41. The spring 49, intermediate its ends, is coiled around the stem 32 within chamber 41, has one end extended and connected to a pin 50 depending from wall 42, and its other end extended, as at 51 and bearing against the extension 33. The rotating of the valve 19 in one direction is had against the action of spring 49.

The flange 37 of each drum 36 intermittently provides a closure for the open rear of a chamber 41, and the extent of the closing movement of the flange 37 will be such as to enable one to ascertain the air pressure in an inner tube when the apparatus is made active. The flange 37 is formed with a slot 52 for two purposes, one for establishing communications between the chamber 41 and a chamber or pocket 53 to be referred to and the other for the passage of a trip lever 54, to be referred to into the chamber 41 to be positioned in the path of the extension 33 of the valve stem 32, to provide for the rotation of the latter to open valve 19.

There is secured to the flange 37, of each drum 36 by the countersunk holdfast means 55, a segmental shaped member 56, which extends beyond the wall 42 of chamber 41. The member 56 is formed with the chamber 53 which opens at one side into the slot 52 in the flange 37. The chamber 53 is of greater length than slot 52. The member 56 is also formed with a pair of spaced channels 56a, 57, which lead from chamber 53. The channel 56a opens into chamber 53 intermediate the ends of the latter. The channel 57 opens into one end of the chamber 53. That end portion of channel 57 which opens into chamber 53 is of enlarged diameter with respect to the remaining portion of such channel. The member 56 has its outer periphery formed with integral peripherally threaded annular bosses 58, 59. The boss 58 has its inner face form a flush outward continuation of the channel 56. The boss 59 has its inner face form a flush outward continuation of the channel 57. Arranged in the channel 56a and extending from the inner end of the latter to the outer edge of boss 58 is a resilient tube 60 constituting a sealing medium. Arranged in the channel 57 is a tube 61 extending from the inner end of channel 57 to the outer edge of the boss 59. The tube 61 at its inner end is enlarged and snugly fits the enlarged portion of channel 57. Seated against the outer edge of each boss 58 is the flanged end 62 of a tubular combined supporting and guide member for a spring controlled shifting element for a trip lever 54. Seated against the outer edge of each boss 59 is a sealing gasket 63. Seated against each gasket 63 is the flanged end 64 of an air pressure conducting line. The flanged end 62 of each combined supporting and guide member is clamped to a boss 58 by an internally threaded flanged collar 65 having its threads engaging with the threads of the boss 58. Each gasket 63 and the flanged end 64 of an air pressure conducting line are clamped together and to a boss 59 by an internally threaded flanged collar 66 having threads engaging with the threads of the boss 59.

Four combined supporting and guide members are employed; two for correlation with the front tires and two for correlation with the rear tires of the vehicle. The said members, which correlate with the front tires are indicated 67, 68 and are oppositely disposed. The said members which correlate with the rear tires are indicated at 69, 70 and are oppositely disposed. The shifting elements are indicated at 71, 72, 73, 74 and are slidably mounted in the members 67, 68, 69, 70 respectively. Each shifting element is of a length to extend from one end of its correlated member through the tube 60 into a chamber 53 and it is pivotally connected as at 71 to one end of the trip lever 54. Each shifting element is also of a length to project from the other end of its correlated member, as at 75. The projecting portions 75 of the shifting elements are secured to a common coupling plate 76 therefor. The plate 76 is connected to a spring controlled pull member 77 slidably mounted in the dashboard 1. The member 77 includes a head portion 78 and a shank 79 extending forward from the latter and fixed to plate 76. Interposed between the dashboard 1 and the plate 76, as well as surrounding the shank 79 is a coiled controlling spring 80 normally acting to maintain the elements extended to normally hold the trip lever 53 in the full line position shown by Figure 3.

Four air pressure conducting lines are employed; two for correlation with the front tires and two for correlation with the rear tires of the wheels of the vehicle. The said lines which correlate with the front tires are indicated at 81, 82. The said lines which correlate with the rear tires are indicated at 83, 84. Each air pressure conducting line aligns at one end with the outer end of and communicates with a tube 61. Supported by the dashboard 1 are air pressure gauges 85, 86, 87, 88 having their dials 89 facing the operator of the vehicle. The other ends of the air pressure conducting lines 81, 82, 83, 84 are connected to and open into the gauges 85, 86, 87, 88 respectively.

The trip lever 54 is of L-shaped contour, disposed flatwise and normally inclined. The lever 54 is formed of a stem 90 and a nose 91 disposed at right angles to one end of the stem 90. The other end of the latter is provided with the pivotal connection 71 between the lever and its shifting element. Arranged in each chamber 53 is an upstanding support 92 enlarged at its upper and lower end. The support 92 extends upwardly through the stem 90 of a lever 54, and functions as a pivot and also as a support for the lever.

If it be desired to ascertain the air pressure with respect to the tires of the vehicle, the pull member 77 is pulled rearwardly against the action of the spring 80. On moving the pull member 77 rearwardly the elements 71, 72, 73, 74 are also pulled rearwardly in unison and which will shift the trip levers 54 in a direction to position the noses 91 thereof in the path of the extensions 33 of the valve stems 32. As the tires of the vehicle wheel are revolving the extensions 33 of the valve stems 32 will be carried to impact against the noses 91, whereby valve stems 32 will be partly rotated to shift the valves 19 to a position to establish communication between the inner tubes and the pressure gauges for the purpose of enabling the operator of the vehicle to ascertain the air pressure relation with respect to the wheel tires. Immediately after the extensions 33 clear the noses 91, the valves 19 will be automatically returned to closed position. After the pressure has been indicated by the gauges the operator releases the member 77 and the shifting elements are returned to the position, Figure 1, and the trip levers to the full line position, Figure 3.

What I claim is.

1. In an apparatus for the purpose set forth, an air pressure indicating gauge adapted to be carried by an automative vehicle, a normally closed air pressure conducting off structure including a normally closed spring controlled rotatable controlling valve having a stem formed with an angular extension, said structure adapted to be connected to, permanently opening into and bodily carried with the inner tube of a tire of a vehicle, said structure including an air receiving chamber at its inner end normally closed to the inner tube by said valve and in which is arranged said extension, a supporting member carried by the vehicle and formed with a pocket adapted to intermittently register with said receiving chamber during the revolving of said inner tube, an air pressure conducting off line leading from the pocket in said member to said gauge, said line being normally closed to the inner tube by the valve of said structure and free of connection to the latter, and a reciprocal spring controlled means supported by said member and the body of the vehicle including a pivotally mounted angle-shaped trip lever arranged in said pocket for extending into said chamber, said lever being free of connection to and correlated with said extension to provide, when extended into the said chamber for coaction with said extension to shift said valve stem in a direction to open the valve to thereby establish communication between said inner tube and said gauge to indicate the air pressure in relation to the inner tube.

2. In an apparatus for the purpose set forth, an air pressure indicating gauge adapted to be carried by an automotive vehicle, a normally closed air pressure conducting-off structure adapted to be secured to a brake drum including a normally closed spring controlled rotatable controlling valve, said structure adapted to be connected to and bodily carried with an inner tube of a tire of a vehicle, said structure including an outer air pressure receiving chamber permanently opening into said inner tube and an inner air receiving chamber, said valve normally closing said inner chamber to said outer chamber and having an angular extension suspended in said inner chamber, a supporting member adapted to be carried by the vehicle and having a pocket adapted to intermittently open into said inner chamber on the revolving of the inner tube, an air pressure conducting off line leading from the pocket in said member to said gauge, and a reciprocal spring controlled means supported by said member and the body of the vehicle including a trip lever pivotally mounted in said pocket for extending into said chamber, said lever being free of connection to and cooperating when extended into said chamber with said extension to provide for the shifting of said valve in a direction to open it to thereby provide for said conducting off line establishing communication between said inner tube and said gauge to indicate the air pressure in relation to said inner tube.

GEORGE P. LUCIUS.